B. KUHL.
ICE CREAM FREEZER.
APPLICATION FILED APR. 11, 1912.
1,050,665.
Patented Jan. 14, 1913.
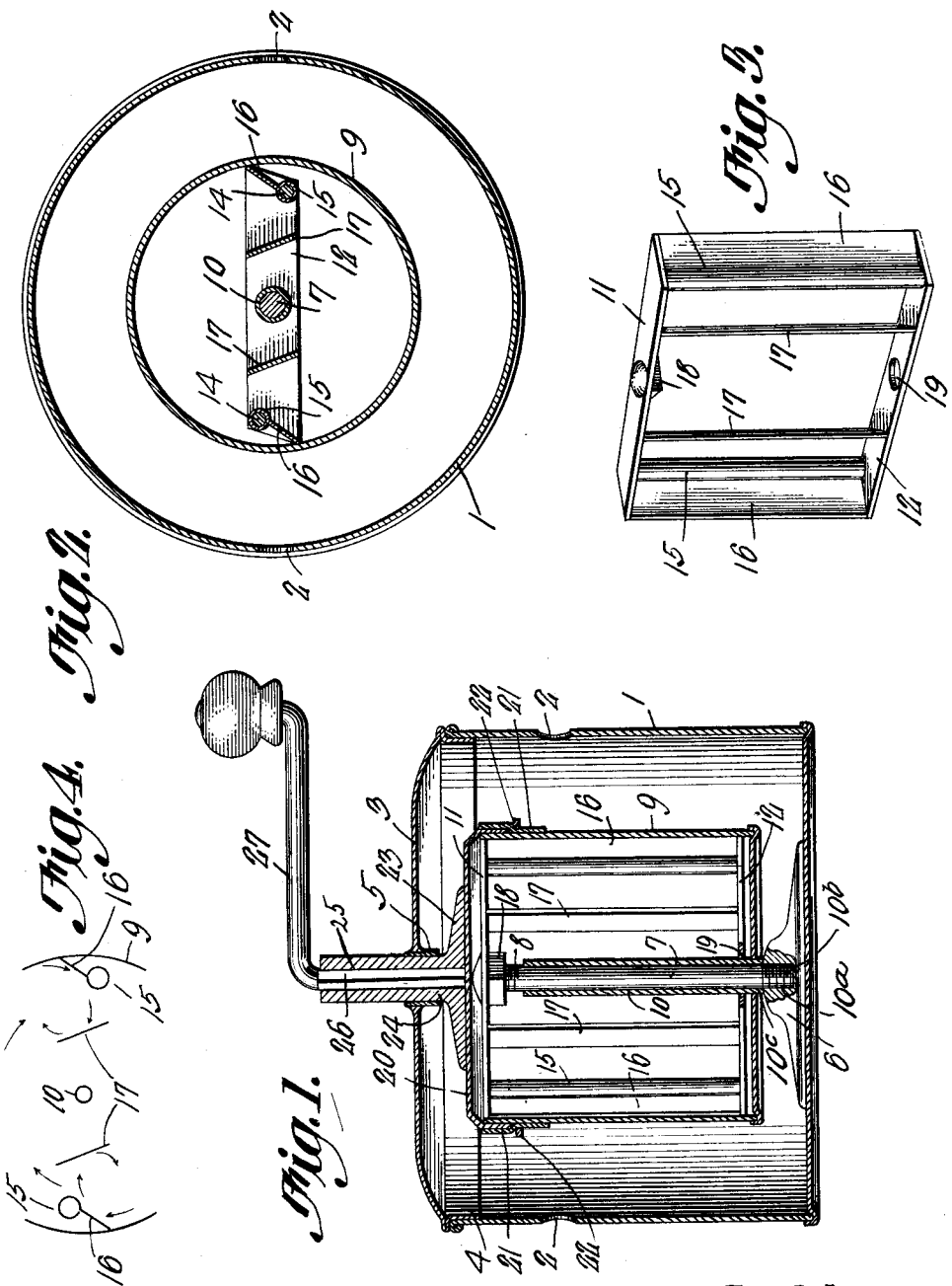
Witnesses
Burchard Kuhl Inventor
by C.A.Snow&Co.
Attorneys

UNITED STATES PATENT OFFICE.

BURCHARD KUHL, OF ORLANDO, FLORIDA.

ICE-CREAM FREEZER.

1,050,665.

Specification of Letters Patent.  Patented Jan. 14, 1913.

Application filed April 11, 1912. Serial No. 690,028.

*To all whom it may concern:*

Be it known that I, BURCHARD KUHL, a citizen of the United States, residing at Orlando, in the county of Orange and State of Florida, have invented a new and useful Ice-Cream Freezer, of which the following is a specification.

The present invention aims to provide novel means for connecting the inner and outer receptacles of a freezer with the dasher.

With the foregoing and other objects in view, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in vertical longitudinal section, parts appearing in elevation; Fig. 2 is a transverse section; Fig. 3 is a perspective of the dasher; and Fig. 4 is a diagrammatic view illustrating the operation of the invention.

In carrying out the invention there is provided an outer, ice-receptacle 1 provided in its side wall with drainage openings 2. A lid 3 for the outer receptacle 1 is provided, the lid 3 being provided, if desired, with a depending flange 4 adapted to be received within the receptacle 1. The lid 3 is centrally provided with a tubular bearing 5. Fixed to and upstanding from the bottom of the outer receptacle 1 is a pedestal 6 carrying a shaft 7, the upper end of which is threaded as indicated at 8.

The invention further includes an inner, cream-receptacle 9, centrally provided with a tubular bearing 10 receiving the shaft 7, the pedestal 6 constituting a support for the cream-receptacle 9, the receptacle being mounted, by means of the bearing 10, to rotate about the shaft 7.

The invention further includes a dasher, located within the cream receptacle 9, and fixed with respect to the cream receptacle. The dasher, as disclosed most clearly in Fig. 3, comprises a top plate 11, a bottom plate 12, and shafts 14 connecting the respective plates 11 and 12 adjacent the ends of the dasher. The shafts 14 carry fixed scraping blades 16, the scraping blades 16 being provided with sleeves 15 in which the shafts 14 are received. The outer edges of the scraping blades 16 are positioned in close proximity to the wall of the cream-receptacle 9, so that when the cream-receptacle 9 is rotated, the material will be discharged against the scraping blades 16. The dasher further includes deflecting blades 17 connecting the top plate 11 with the bottom plate 12, the deflecting blades 17 being located between the scraping blades 16. The deflecting blades 17 are located, each, at an angle to the adjacent scraping blade 16. The scraping blades 16 are parallel to each other, and the deflecting blades 17 are parallel to each other, all of the blades 16 and 17 being parallel to the axis of rotation of the cream-receptacle 9. The longitudinal edges of each of the deflecting blades 17 are spaced at different distances from the center of rotation of the cream-receptacle 9, that is, at different distances from the axis of the shaft 7. The top plate 11 of the dasher is provided with a boss 18, and the bottom plate 12 of the dasher is provided with an opening 19. The opening 19 is adapted to receive the tubular bearing 10 of the inner receptacle 9, the threaded portion 8 of the shaft 7 being received in the boss 8, whereby the dasher is held against rotation upon the shaft 7. A cover 20 for the inner receptacle 9 is provided, the same having fingers 21 received within sockets 22 formed in the side walls of the receptacle 9, the construction being such that independent rotation between the cover 20 and the receptacle 9 is impossible. Fixed to the outer face of the cover 20 is a pedestal 23, carrying a shaft 24 extending through and rotatable in the bearing 5. The shaft 24 is equipped with a polygonal socket 25, adapted to receive the polygonal end 26 of an operating crank 27.

Attention is directed to the fact that the crank 27 may readily be mounted in the socket 25 of the shaft 24, after the closure 3 is in place, and without removing or disturbing the closure in any way. The socket 25 preferably extends through the pedestal 23, and consequently the crank 27 is engaged with the shaft 24 at a point below the closure 3 and adjacent the closure 20. The driving effort of the crank 27 is, therefore, applied close to the closure 20, the advantage of which is obvious.

It is to be noted that the lower end of the shaft 7 is threaded as shown at $10^b$ to engage with a threaded opening 10ᵃ in the pedestal 6. The shaft 7 may be mounted readily in the pedestal 6, and, with equal facility be removed therefrom. As shown at 10ᶜ, the member 10 protrudes beyond the bottom of the inner receptacle 9 and engages the pedestal 6 to space the bottom of the inner receptacle from the pedestal. The friction between the receptacle 9 and the pedestal is reduced accordingly.

In practical operation, when the crank 27 is rotated, rotatory movement will be imparted to the shaft 24, and thence by means of the pedestal 23 to the cover 20 and through the interengaging elements 21 and 22 to the cream-receptacle 9, the cream-receptacle 9 being thus rotated with the shaft 7 as a center of rotation. The dasher, it will be recalled, is fixedly held upon the shaft 7. When the cream-receptacle 9 is rotated, the material which is adjacent the wall in the cream-receptacle will be discharged against the scraping blades 16, attention being directed particularly to Fig. 4. The scraping blades 16 will discharge a portion of the material against the deflecting blades 17, the deflecting blades 17 serving to return the material toward the outer wall of the receptacle 9. Thus, a portion of the material will be rotated about an axis located between the blades 16 and 17, this axis traveling in a circular orbit about the axis of the shaft 7. A thorough agitation of the contents of the receptacle 9 will thus be produced. A portion of the material, however, will escape between the blades 16 and 17, as indicated in Fig. 4. It is to be noted that the longitudinal edges of each blade 17 are spaced at unequal distances from the axis of the shaft 7. By reason of this fact, the material which escapes from between one pair of blades 16—17 will be caught by the opposite blade 17, and be carried between such blade and the adjacent blade 16, the material thus received being given a whirling or rotatory motion, and being deflected toward the outer wall of the receptacle 9, in the manner hereinbefore described.

The device is of few parts, and may be constructed at trifling expense. The construction is such, as hereinbefore described, that a thorough agitation of the contents of the receptacle 9 will be secured.

Having thus described the invention, what is claimed is:—

1. In a device of the class described, an outer receptacle provided with a cover having a bearing; an inner receptacle journaled within the outer receptacle and provided with a cover; a pedestal secured to the cover of the inner receptacle and provided with a socket journaled in the bearing, the bore of the socket being extended below the cover of the outer receptacle; and a crank mounted in the bore of the socket and engaging the socket below the cover of the outer receptacle, thereby to impart rotary movement to the inner receptacle at a point adjacent the cover of the inner receptacle.

2. In a device of the class described, an outer receptacle; a pedestal secured to the bottom of the outer receptacle; a shaft threaded at both ends and having one of its ends threaded into the pedestal; an inner receptacle having a tubular bearing receiving the shaft, the bearing protruding below the bottom of the receptacle to space the same from the pedestal; a dasher surrounding the bearing, the other threaded end of the shaft being engaged with the upper portion of the dasher to hold the dasher against rotation; and means for rotating the inner receptacle.

In testimony that I claim the foregoing as my own, I have hereto affixed my signature in the presence of two witnesses.

BURCHARD KUHL.

Witnesses:
SELINA WILLSON,
ERNEST G. PELOG.

---

Copies of this patent may be obtained for five cents each, by addressing the "Commissioner of Patents, Washington, D. C."